United States Patent
Riemann et al.

(10) Patent No.: US 11,858,042 B2
(45) Date of Patent: Jan. 2, 2024

(54) OPEN LOOP PARAMETER OPTIMIZATION FOR ADDITIVE MANUFACTURING

(71) Applicant: FORMALLOY TECHNOLOGIES, INC., Spring Valley, CA (US)

(72) Inventors: Jeffrey L. Riemann, Spring Valley, CA (US); Kurt Moran, Spring Valley, CA (US); Michael Juhasz, Spring Valley, CA (US)

(73) Assignee: FORMALLOY TECHNOLOGIES, INC., San Diego, CA (US)

( * ) Notice: Subject to any disclaimer, the term of this patent is extended or adjusted under 35 U.S.C. 154(b) by 129 days.

(21) Appl. No.: 17/410,898

(22) Filed: Aug. 24, 2021

(65) Prior Publication Data
US 2023/0068708 A1  Mar. 2, 2023

(51) Int. Cl.
| | |
|---|---|
| *B22F 10/85* | (2021.01) |
| *B22F 10/25* | (2021.01) |
| *B33Y 10/00* | (2015.01) |
| *B22F 10/366* | (2021.01) |
| *B22F 10/368* | (2021.01) |

(Continued)

(52) U.S. Cl.
CPC .............. *B22F 10/85* (2021.01); *B22F 10/25* (2021.01); *B22F 10/366* (2021.01); *B22F 10/368* (2021.01); *B22F 12/41* (2021.01); *B22F 12/90* (2021.01); *B33Y 10/00* (2014.12); *B33Y 50/02* (2014.12); *B22F 2203/11* (2013.01)

(58) Field of Classification Search
CPC ........ B22F 10/85; B22F 10/25; B22F 10/366; B22F 10/368; B22F 12/41; B22F 12/90; B22F 2203/11; B33Y 10/00; B33Y 50/02

USPC .......................................................... 700/118
See application file for complete search history.

(56) References Cited

U.S. PATENT DOCUMENTS

| | | |
|---|---|---|
| 8,809,780 B2 | 8/2014 | Wollenhaupt et al. |
| 10,112,262 B2 | 10/2018 | Cheverton et al. |

(Continued)

FOREIGN PATENT DOCUMENTS

| | | |
|---|---|---|
| WO | 2016196382 A1 | 5/2016 |
| WO | 2019067471 A2 | 4/2019 |

OTHER PUBLICATIONS

Nassar et al., Intra-layer closed-loop control of build plan during directed energy additive manufacturing of Ti-6AI-4V, Additive Manufacturing 6, 2015, pp. 39-52.

(Continued)

*Primary Examiner* — Michael J Brown
(74) *Attorney, Agent, or Firm* — Dinsmore & Shohl LLP (57) ABSTRACT

Certain aspects of the present disclosure provide a method for optimizing process parameters for additive manufacturing, including: determining a change to at least one process parameter of a plurality of process parameters while additively manufacturing a first part using an additive manufacturing apparatus according to a build file comprising machine code defining the plurality of process parameters; modifying the build file based on the determined change to the at least one process parameter to generate a modified build file; additively manufacturing a second part using the additive manufacturing apparatus according to the modified build file, wherein: additively manufacturing the first part is performed in a closed-loop control mode, and additively manufacturing the second part is performed in an open-loop control mode.

20 Claims, 4 Drawing Sheets

(51) Int. Cl.
    *B22F 12/90*     (2021.01)
    *B33Y 50/02*     (2015.01)
    *B22F 12/41*     (2021.01)

(56) References Cited

U.S. PATENT DOCUMENTS

| | | |
|---|---|---|
| 10,252,335 B2 | 4/2019 | Buller et al. |
| 10,421,267 B2 | 9/2019 | Reese et al. |
| 10,753,955 B2 | 8/2020 | Blom et al. |
| 2019/0004079 A1* | 1/2019 | Blom .................. B33Y 50/02 |
| 2020/0272127 A1 | 8/2020 | Roychowdhury et al. |
| 2021/0387263 A1* | 12/2021 | Komsta ................ B23K 26/342 |

OTHER PUBLICATIONS

Liu et al., Image analysis-based closed loop quality control for additive manufacturing with fused filament fabrication, Journal of Manufacturing Systems 51, 2019, pp. 75-86.

\* cited by examiner

OPEN LOOP PARAMETER OPTIMIZATION FOR ADDITIVE MANUFACTURING

INTRODUCTION

The present disclosure relates to additive manufacturing, and in particular, to systems and methods for optimizing open-loop additive manufacturing process parameters using closed-loop process parameter discovery.

Additive manufacturing is generally the process of manufacturing an object with material-additive methods. Examples of commercially available additive manufacturing methods include extrusion-based methods (e.g., Fused Deposition Modeling (FDM)), fusing or binding from a powder bed based methods (e.g., Selective Laser Sintering (SLS), Selective laser melting (SLM), and Electron beam melting (EBM)), lamination methods, photopolymerization methods (e.g., stereo lithography), powder- or wire-fed directed energy deposition methods (e.g., direct metal deposition (DMD), laser additive manufacturing (LAM), laser metal deposition (LlVlD)), and others, for example, as described in ASTM/ISO 52900-15.

Laser metal deposition (LlVlD) is a laser-based additive manufacturing process in which metal structures are built up on a substrate, or metal layers and structures are applied to existing components (e.g., cladding) in layers. In LMD, a laser generates a molten "melt-pool" on an existing surface into which metal powder is deposited through a nozzle in a deposition head (e.g., using a carrier gas). The powder melts and bonds with the base material in the molten pool thereby forming new layers of a part being additively manufactured.

Laser metal deposition, like other additive manufacturing techniques, is process parameter driven. For example, parameters such as laser power, scan rate, powder feed rate, carrier gas flow rate, and many others must be set precisely by an operator in order that the manufacturing process generates high-quality parts, and in order that the process is repeatable. Making this problem more challenging, these parameters often need to vary throughout the build process, such as between layers and within layers in a multi-layered part. Unfortunately, determining these parameters is a complex multi-variate optimization problem that is conventionally approached through brute-force, manual experimentation. That is, conventionally, a skilled operator may try different combinations of parameters in repeated attempts at building a part that meets various design criteria. Such manual experimentation is time-consuming, labor-intensive, and consumes significant raw materials and power. In many cases, the manual process concludes with compromises in part quality, durability, build time, build cost, etc. without a true optimal set of process parameters.

Accordingly, improved systems and methods are needed for determining optimal process parameters for additive manufacturing processes.

SUMMARY

Certain embodiments provide a method for optimizing process parameters for additive manufacturing, including: determining a change to at least one process parameter of a plurality of process parameters while additively manufacturing a first part using an additive manufacturing apparatus according to a build file comprising machine code defining the plurality of process parameters; modifying the build file based on the determined change to the at least one process parameter to generate a modified build file; additively manufacturing a second part using the additive manufacturing apparatus according to the modified build file, wherein: additively manufacturing the first part is performed in a closed-loop control mode, and additively manufacturing the second part is performed in an open-loop control mode.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for determining optimal process parameters for additive manufacturing processes.

As above, manual discovery of optimal process parameters is a challenging if not intractable problem. Setting such process parameters generally involves making changes to machine control code that may span thousands, tens of thousands, or even more lines of code. Simply finding the right line of code to modify in hopes of correcting a manufacturing issue can be significantly challenging, much less finding and making detailed modifications to any number of lines of control code. Further, a single change to line of machine control code may have interactions with other control codes, and therefore may create knock-on effects that must be dealt with subsequently. Because such process parameters can significantly affect characteristics of a built part, which can in-turn affect its performance and, for example, safety in use, it is critical to determine optimal process parameters for additive manufacturing.

One approach for improving process parameter determination is through closed-loop control of the additive manufacturing process based on sensor feedback. For example, if a certain temperature of a laser metal deposition melt-pool is desired through the manufacturing process, a temperature sensor can continually measure the melt-pool temperature and dynamically adjust laser power to adjust the temperature up and down during the processing.

While closed-loop control offers many benefits over conventional "guess and check" approaches for determining process parameters for additive manufacturing, it may not always be an available approach. For example, for building certain parts according to certification requirements, closed-loop control of the manufacturing process may not be allowed. At least one rationale behind such a limitation is that to meet the certification requirements, which may be intended to guarantee part quality, safety, etc., the manufacturing process should be repeatable according to established, provable, and consistent process parameters. Deviation from those process parameters may suggest some manufacturing issue that should prevent the part from being used in a critical application, such as a safety application.

Accordingly, aspects described herein relate to using closed-loop control of an additive manufacturing process to determine optimal process parameters for an open-loop control mode. For example, a test part may be built using an initial set of process parameters with closed-loop control activated during the build process. During the build, the closed-loop control may modify various process parameters from their original values based on sensor feedback. These variations may then be analyzed after a build and used to modify the initial set of process parameters to generate an improved set of process parameters. This process may be performed iteratively, if necessary, to ultimately discover optimal process parameters. The optimal process parameters may then replace the initial set of process parameters and be used in an open-loop additive manufacturing control mode, which may comply with certification rules and protocols for manufacturing certain types of parts.

Beneficially, aspects described herein lead to improved additive manufacturing processes that are repeatable, which in-turn lead to higher quality, more durable, more reliable, safer, and certifiable parts. Further, significantly less material and energy is wasted in pursuit of such improved process parameters compared to conventional guess and check methods.

Example Additive Manufacturing System

Figure 1:
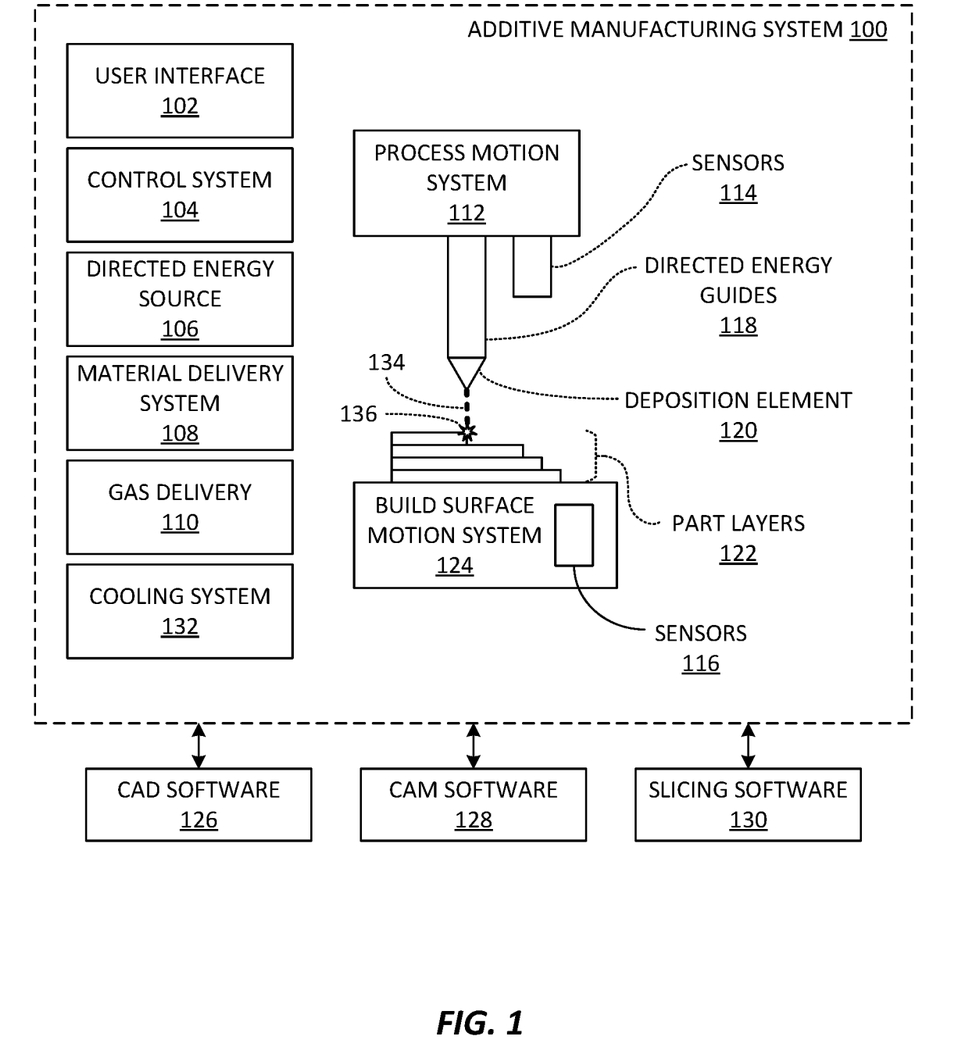
FIG. 1 depicts an example of an additive manufacturing system, which may be configured to perform aspects described herein.

FIG. 1 depicts an example of an additive manufacturing system 100, which may be configured to perform various aspects described herein.

In this example, additive manufacturing system 100 includes a user interface 102. User interface 102 may be, for example, a graphical user interface comprising hardware and software controls for controlling additive manufacturing system 100. In some examples, user interface 102 may be integral with additive manufacturing system 100 while in other examples user interface 102 may be remote from additive manufacturing system 100 (e.g., on a remote computer such as a server computer, desktop or laptop computer, or a personal electronic device, such as a smartphone, tablet computer, or a smart wearable device, to name a few examples).

Additive manufacturing system 100 also includes a control system 104. In this example, control system 104 is in data communication with user interface 102 as well as directed energy source 106, material delivery system 108, gas delivery system 110, process motion system 112, sensors 114, sensors 116, build surface motion system 124, and cooling system 132. In other examples, control system 104 may be in data communication with further elements of additive manufacturing system 100, which are not depicted in this example. Further, in other examples, control system 104 may be in data communication with fewer elements of additive manufacturing system 100, such as where another embodiment of an additive manufacturing system includes fewer elements compared to the example of FIG. 1.

Control system 104 may include hardware and software for controlling various aspects of additive manufacturing system 100. For example, control system 104 may include one or more processors, memories, data storages, physical interfaces, software interfaces, software programs, firmwares, and other aspects in order to coordinate and control the various elements of additive manufacturing system 100. In some examples, control system 104 may include network connectivity to various aspects of additive manufacturing system 100 as well as to external networks, such as the Internet and other networks, such as local area networks (LANs) and wide area networks (WANs). In some examples, control system 104 may be a purpose-built logic board, microcontroller, field programmable gate array (FPGA), or the like, while in other examples control system 104 may be implemented by a general purpose computer with specific software components for controlling the various aspects of additive manufacturing system 100.

Control system 104 may generally interpret commands received from user interface 102 and thereafter cause appropriate control signals to be transmitted to other aspects of additive manufacturing system 100. For example, a user may input data representing a part to be processed using additive manufacturing system 100 into user interface 102 and control system 104 may act upon that input to cause additive manufacturing system 100 to process the part.

In some examples, control system 104 may compile and execute machine control codes, such as G-code data, that causes aspects of additive manufacturing machine 100 to operate. For example, the machine control codes may cause process motion system 112 or build surface motion system 124 to move to specific positions and at specific speeds. As another example, the machine control codes may cause directed energy source 106, material delivery system 108, gas delivery system 110, or cooling system 132 to activate or deactivate at specific times, locations, or based on specific conditions, such as operating conditions, sensor readings, and the like. Further, the machine control codes may modulate the operation (e.g., via a settable operational parameter) of the aforementioned aspects of additive manufacturing machine 100, such as by increasing or decreasing the power of directed energy source 106, increasing or decreasing the flow rate of material delivery system 108 or gas delivery system 110, increasing or decreasing the working distance of deposition element 120, increasing or decreasing a scan speed of deposition element 120, increasing or decreasing amount of cooling by cooling system 132, etc., based on time, location, and/or conditions, such as operating conditions, sensor readings, and the like.

Process motion system 112 may move elements of additive manufacturing system 100 to specified positions. For example, process motion system 112 may position deposition element 120 at a specified distance from a part layer 122 being manufactured, or move deposition element 120 along a preprogrammed path to build up a three-dimensional part.

Additive manufacturing system 100 may include various sensors to monitor and to help control aspects of a manufacturing process through active feedback. In some embodiments, sensors 114 may be connected to process motion system 112 such that the sensors are configured to move with process motion system 112. For example, sensors 114 may include one or more temperature sensor, distance sensors, optical sensors (e.g., camera or video sensors), profilometers (e.g., optical, laser, and others), acoustic sensors, material flow sensors, and other sensors, each of which may be configured to provide operational data during processing by additive manufacturing system 100. For example, temperature sensors may provide point temperature measurements, temperature gradients, heat maps, etc.

In some embodiments, a temperature sensor of sensors 114 may be any sort of sensor capable of measuring temperature to an object. In some examples, the temperature sensor 114 may include a contact-based sensor, such as a thermocouple, while in others, the temperature sensor may be a contact-less sensor, such as a photo or laser-based sensor. One or more temperature sensors may provide various types of temperature data back to control system 104, for example, to provide data for closed-loop control of directed energy source 106, gas delivery system 110, cooling system 132, and process motion system 112 (e.g., to control a scan speed of deposition element 120 and/or working distance of deposition element 120).

In some embodiments, sensors 114 may include various forms of optical sensors (e.g., image and/or camera sensors), such as a visible spectrum optical sensor, or a non-visible spectrum (e.g., infrared) optical sensor. In some examples, the same sensor may be able to provide data in multiple spectrums. Further, additive manufacturing system 100 may include optics that allow for directing, changing (e.g., zoom), and focusing a field of view of an optical sensor. Optical sensors may generally provide various types of image data, including infrared heat data, back to control system 104, for example, to provide data for closed-loop control of directed energy source 106, gas delivery system 110, cooling system 132, and process motion system 112 (e.g., to control a scan speed of deposition element 120 and/or working distance of deposition element 120). For example, an infrared-based optical sensors (e.g., an infrared image sensor) may be used to view heat distributions and gradients in part layers 122. As another example, an infrared-based optical sensor may be used to measure process area (e.g., melt-pool) size, position, geometry, and the like.

In some embodiments, various sensors, such as image sensors and contactless temperature and distance sensors, may be configured to sense an active processing area 136, such as a melt-pool created by deposition element 120. For example, a boresight camera or other sensor may be configured with optics that allow for "looking" down the directed energy axis (e.g., axis of beam 134) towards the part being manufactured, such as by using turning mirrors, one-way mirrors, and other optical elements.

Directed energy source 106 may provide any suitable form of directed energy, such as a laser beam (e.g., from a fiber laser) or an electron beam generator, which is capable of melting a manufacturing material, such as a metal powder. Directed energy source 106 may interact with directed energy guides 118 in order to, for example, direct or focus a particular type of directed energy. For example, directed energy guides 118 may comprise one or more optical elements, such as mirrors, lenses, filters, and the like, configured to focus a directed energy beam (e.g., laser beam) at a specific focal point (e.g., active processing area 136) and to control the size of the focal point. In this way, the actual creation of the directed energy beam by directed energy source 106 may be located remote from the manipulation and focusing of the directed energy by directed energy guides 118.

In some embodiments, directed energy source 106 may also be used to remove material from a manufactured part, such as by ablation. Further, directed energy source 106 may also be used to perform hardening and surface polishing. These are just some examples, and others are possible.

Material delivery system 108 may supply building material, such as a powder or wire, to deposition element 120. In some examples, material delivery system 108 may be a remote reservoir including one or more types of raw material (e.g., different types of metal) to be used by additive manufacturing system 100. Material delivery system 108 may be configured to provide one or more materials simultaneously to deposition element 120, such that multiple materials (e.g., metal alloys) may be deposited in part layers 122 (e.g., forming hybrid material layers).

Deposition element 120 may be connected with material delivery system 108 and may direct material, such as powder, towards a focal point of directed energy beam 134. In this way, material delivery system 108 may help control the amount of material that is additively manufactured at a particular point in time. Deposition element 120 may include nozzles, apertures, and other features for directing material, such as metal powder, towards a manufacturing surface, such as a build surface or previously deposited material layer. In some examples, deposition element 120 may have controllable characteristics, such as controllable nozzle aperture sizes. In some embodiments, deposition element 120 may be a nozzle assembly or deposition head of a directed energy deposition machine, such as a laser metal deposition machine.

Laser metal deposition is a laser-based additive manufacturing process in which metal structures are built up on a substrate or metal layers and structures are applied to existing components (e.g., cladding) in layers. In laser metal deposition, a laser generates a molten pool (or melt-pool) on an existing surface into which metal powder is directed through a nozzle in a deposition head (e.g., using a carrier gas). The powder melts and bonds with the base material in the molten pool thereby forming new layers and ultimately structures additively.

Gas delivery system 110 may be connected with deposition element 120 to provide propulsive force to the material provided by material delivery system 108, such as by use of carrier gas. In some examples, gas delivery system 110 may modulate the gas flow rate to control material (e.g., powder) flow through deposition element 120 and/or to provide cooling effect during the manufacturing process.

Gas delivery system 110 may include feeds for a plurality of gas flows, such as carrier gas (as described above) as well as shield gas and auxiliary gas flows, such as directed actively cooled gas flows. Gas delivery system 110 may also include feeds for different types of gases so that, for example, different gases may be used for carrier gases, shield gases and auxiliary gases. Gas delivery system 110 may further be configured to provide different gas flows at different rates under the control of control system 104.

Gas delivery system 110 may also be connected with cooling system 132, which may actively cool any of the gas aforementioned gas flows (e.g., carrier, shield, and auxiliary). Cooling system 132 may be configured to apply different amounts of cooling to different gases under the control of control system 104.

Notably, while directed energy source 106, material delivery system 108, gas delivery system 110, sensors 114, sensors 116, directed energy guides 118, and deposition element 120 are shown in an example configuration in FIG. 1, other configurations are possible.

Process motion system 112 may control the positioning of one or more aspects of additive manufacturing system 100, such as sensors 114, sensors 116, and deposition element 120. In some examples, process motion system 112 may be movable in one or more degrees of freedom (e.g., three to six degrees of freedom). For example, process motion system 112 may move and rotate deposition element 120 in and about the X, Y, and Z axes during the manufacturing of part layers 122. For example, rotation about the X axis may be referred to as the 'A' axis, rotation about the Y axis may be referred to as the 'B' axis, and rotation about the Z axis may be referred to as the 'C' axis.

Though not depicted, in various embodiments, process motion system 112 may include cooling elements, such as cooling tubes, fins, channels, lines, and the like. In some embodiments, cooling system 132 may be configured to actively control the temperature of (e.g., to cool) process motion system 112, or parts thereof, such as sensors 114.

Build surface motion system 124 may control the positioning of, for example, a build surface upon which part layers 122 are manufactured. In some examples, build surface motion system 124 may be movable in and about one or more degrees of freedom. For example, build surface motion system 124 may move and rotate the build surface in and about the X, Y, and Z axes during the manufacturing of part layers 122. In some examples, the build surface may be referred to as a build plate or build substrate.

Build surface motion system 124 may also comprise sensors 116, which may include, for example, load sensors, temperature sensors (e.g., a substrate temperature sensor), position sensors, and other sensors that may provide useful information to control system 104. For example, a temperature sensor within build surface motion system may cause control system 104 to increase cooling via cooling system 132, or to decrease power to a directed energy source, and the like.

Though not depicted, in various embodiments, build surface motion system 124 may include cooling elements, such as cooling tubes, fins, channels, and the like. In some embodiments, cooling system 132 may be configured to actively control the temperature of (e.g., to cool) build surface motion system 124, or parts thereof, such as a substrate of build surface motion system 124.

Cooling system 132 may be any sort of active cooling system, such as refrigeration system, a vortex cooler, evaporative gas cooling system, heat pump, and others. Active cooling generally refers to taking an input coolant medium (e.g., fluid or gas) and extracting heat from that coolant medium such that the output coolant medium has a lowered temperature.

Computer-Aided Design (CAD) software 126 may be used to design a digital representation of a part to be manufactured, such as a 3D model. CAD software 126 may be used to create 3D design models in standard data formats, such as DXF, STP, IGS, STL, and others. While shown separate from additive manufacturing system 100 in FIG. 1, in some examples CAD software 126 may be integrated with additive manufacturing system 100.

Slicing software 130 may be used to "slice" a 3D design model into a plurality of slices or design layers. Such slices or design layers may be used for the layer-by-layer additive manufacturing of parts using, for example, additive manufacturing system 100.

Computer-Aided Manufacturing (CAM) software 128 may be used to create machine control codes, for example, G-Code, for the control of additive manufacturing system 100. For example, CAM software 128 may create code in order to direct additive manufacturing system 100 to deposit a material layer along a 2D plane, such as a build surface, in order to build or process a part. Building layers on multiple 2D planes creates 3D structures and surface. For example, as shown in FIG. 1, part layers 122 are manufactured on (e.g., deposited on, formed on, processed on, etc.) build surface motion system 124 using process motion system 112 and deposition element 120. In some cases, the slicing of a part model may not be planar, in which case additive manufacturing system 100 may be configured to deposit material on non-planar surfaces (e.g., on 3D surfaces).

In some examples, one or more of CAD software 126, CAM software 128, and Slicing Software 130 may be combined into a single piece or suite of software. For example, CAD or CAM software may have an integrated slicing function.

Additive manufacturing system 100 may generally be operated in an open-loop or closed-loop control mode (e.g., as controlled by control system 104). For example, in an open-loop control mode, additive manufacturing system 100 may rely directly on process parameters in a build file comprising machine control codes (e.g., G-codes) to operate its various aspects, including process motion system 112, build surface motion system 124, directed energy source 106, material delivery system 108, gas delivery system 110, cooling system 132, and other aspects not shown but otherwise described herein. In an open-loop control mode, data from sensors (e.g., sensors 114 and sensors 116) may be recorded, but not used for control of additive manufacturing system 100.

By contrast, in a closed-loop control mode, additive manufacturing system 100 may rely on process parameters in a build file comprising machine control codes as well as active sensor feedback (e.g., sensors 114 and sensors 116) to operate its various aspects, including process motion system 112, build surface motion system 124, directed energy source 106, material delivery system 108, gas delivery system 110, cooling system 132, and other aspects not shown but otherwise described herein. Thus, initial process parameters in a build file may be overridden during the build process based on sensor data, various thresholds, and the like.

Process Parameter Optimization for Additive Manufacturing

Figure 2:
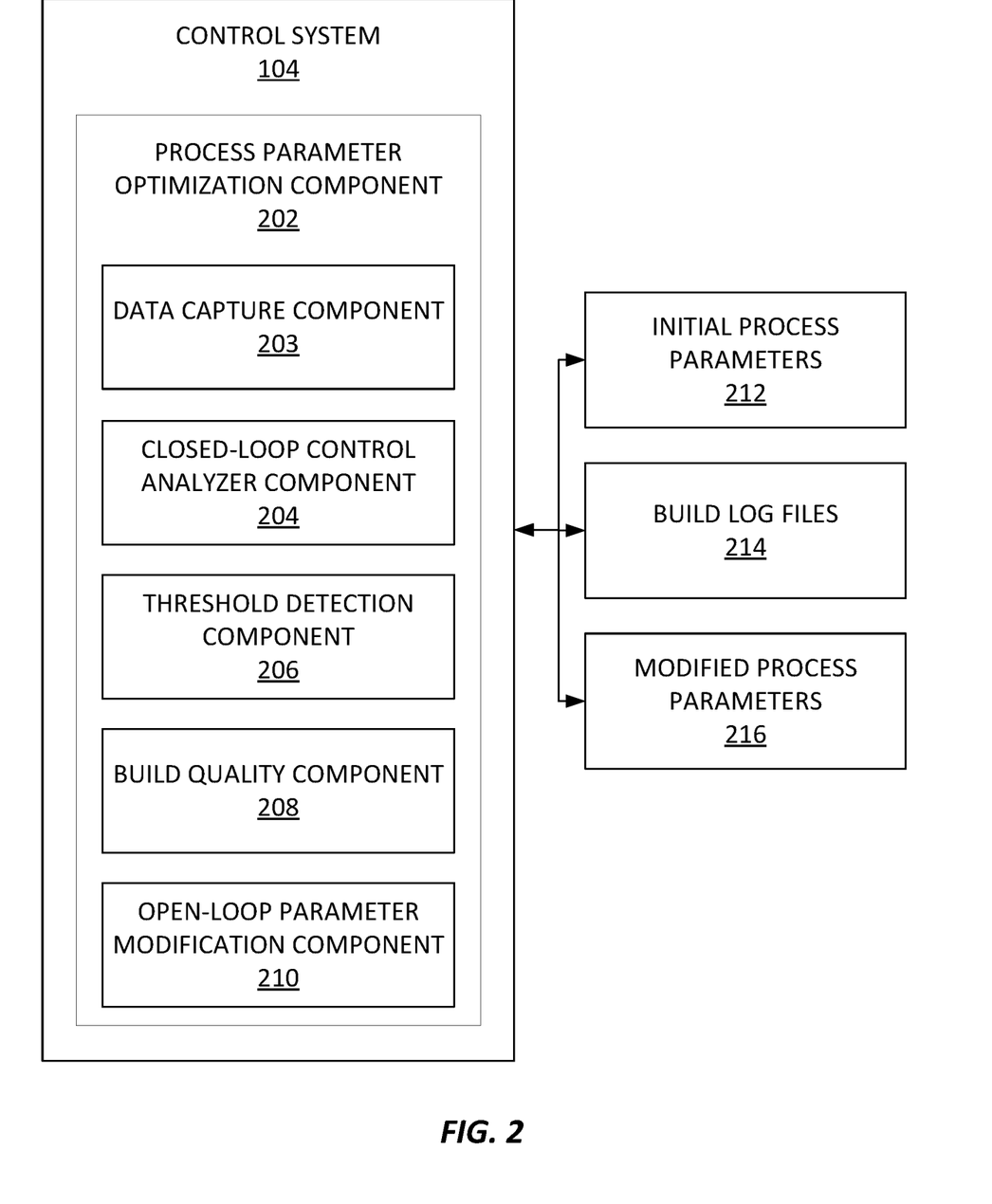
FIG. 2 depicts an example process parameter optimization component.

FIG. 2 depicts an example process parameter optimization component 202. In the depicted example, parameter optimization component 202 includes various illustrative sub-components to more clearly demonstrate various aspects of parameter optimization component 202's operation. However, note that in other embodiments, parameter optimization component 202 may include the same functionalities as described herein regardless of the existence of specific sub-components. Further, process parameter optimization component 202 is depicted as a sub-component of control system 104, but in other embodiments it may be a standalone component configured to work in conjunction with control system 104.

In this example, parameter optimization component 202 includes a data capture component 203. Data capture component 203 may generally be configured to control the capture of data from any aspect of additive manufacturing system 100, as described above with respect to FIG. 1. In some embodiments, data capture component 203 may store captured data in build log files 214.

Build (or process) log files 214 may generally include data regarding the operation of any of the components of additive manufacturing system 100, as described above with respect to FIG. 1. For example, build log files 214 may include parameters, measurements, time-stamps, and other data regarding the operation of process motion system 112, build surface motion system 124, directed energy source 106, material delivery system 108, gas delivery system 110, cooling system 132, and other aspects not shown but otherwise described herein.

Data capture component 203 may be configured to control, for example, when data is captured from various aspects of additive manufacturing system 100, as well as the resolution of that data (e.g., the frequency of data sampling in samples/second or Hz). For example, data capture component 203 may be configured to disable data capture when additive manufacturing system 100 is not depositing material, but enable data capture when additive manufacturing system is depositing material. Similarly, data capture component 203 may be configured to turn on and off sensors based on which aspects of additive manufacturing system 100 are active.

Further, in some embodiments, data capture component 203 may be configured to vary the rate of data capture based on, for example, the complexity or geometry of the underlying layer being built. By way of example, a data capture rate for a straight line of deposited material may be lower than another data capture rate for a complex or sharp curve. As another example, the data capture rate may be scaled based on the speed of movement of an aspect of additive manufacturing system 100, such as the speed of process motion system 112 and/or build surface motion system 124.

By controlling various aspects of data capture based on operating conditions, data capture component 203 may significantly reduce the amount of data storage needed during a build. This is especially important where additive manufacturing builds can take significant periods of time leading to significantly large build log files.

In this example, parameter optimization component 202 further includes a closed-loop control analyzer component 204 configured to identify differences between initial process parameters (e.g., 212) and actual process parameters used during a build process using closed-loop control. The actual process parameters may be stored, for example, in build log files 214 by data capture component 203.

For example, consider the following set of initial parameters and closed-loop control parameters for controlling a laser's power over a portion of a build path in a given layer:

TABLE 1

| Command Description | Initial Process Parameters | Closed-Loop Parameters |
|---|---|---|
| Position process motion system at coordinates (1,1) | G00 X1 Y1 | G00 X1 Y1 |
| Enable laser (M03) and set power level (S) | M03 S255 | M03 S205 |
| Move process motion system (G01) to coordinates (X, Y) at speed (F) | G01 X500 Y1 F500 | G01 X500 Y1 F500 |
| Disable laser (M05) and set power (S) | M05 S0 | M05 S0 |

As depicted in Table 1, an initial set of process parameters may include enabling a laser and setting it to a max power setting (e.g., where the power settings are between S0-S255 in this example). However, during closed-loop control, the laser power parameter was modified to S205 (e.g., the laser power was reduced). The laser power may have been reduced, for example, based on a temperature reading indicating that a melt-pool was getting too hot. The melt-pool getting too hot may have otherwise negatively affected the part quality using the initial process parameters 212. Closed-loop control analyzer component 204 may detect the differences between initial process parameters (e.g., 212) and closed-loop control parameters stored in build log files 214, such as by comparing lines of build code with initial process parameters (describing what an additive manufacturing machine was originally set to do) to lines of build log files (describing what the additive manufacturing machine actually did do).

Note that closed-loop control analyzer may overcome a conventional challenge with trying to update process parameters manually. Because a build file may include thousands, tens of thousands, or even more lines of build code, generally without detailed reference to what specific aspect of a part is being built by a particular line of code, it is impractical if not impossible to perform this step by manual, human analysis. The sheer number of pairwise comparisons makes the job extremely complex and computationally intensive, and thus is not suitable for human analysis and manipulation.

Once differences between initial process parameters and actual process parameters (e.g., based on closed-loop control), such as those stored in build log files 214, are established by closed-loop control analyzer component 204, threshold detection component 206 may determine whether a detected difference is significant enough to modify the initial process parameter for future builds (e.g., by modifying a process parameter in a build file).

For example, threshold detection component 206 may use one or more threshold rules to determine whether each detected difference should be committed as a modified process parameters 216. In some embodiments, there may be process parameter-specific threshold rules, such as a threshold rule for laser power, a different threshold rule for scan rate, a further threshold rule for powder feed rate, and so on. Returning to the example of Table 1, consider that a laser power threshold for process parameter modification is +/−5%. Because in this example the initial process parameter was 255 and the closed-loop control parameter was 205, then the change is negative 20%, which triggers a modification to the process parameter (e.g., a change to one or more lines in a build file), which may be stored in modified process parameters 216 subject to further considerations, described below.

In this example, parameter optimization component 202 further includes a build quality component 208. In some cases, whether an initial process parameter modified by a closed-loop control mode of control system 104 is ultimately committed to an updated build file as a modified process parameter (e.g., 216) may depend on whether the build resulting from the closed-loop control mode is of sufficient quality.

In some embodiments, a determined build quality may require manual feedback of an operator, such as an inspection followed by a data entry provided to the build quality component 208. In other cases, the determined build quality may be based on an automated analysis of the built part performed by aspects of additive manufacturing system 100.

For example, a laser profilometer of sensors 114 may provide a quality score based on the similarity of the built part to the underlying model. This similarity may be compared then to thresholds to determine if the similarity is sufficient to accept the modified process parameters.

In either case, e.g., manual or automated build quality analysis, having a sufficient build quality may act as a gate to whether one or more process parameters modified by a closed-loop control mode become modified process parameters (e.g., 216) for a future build (e.g., integrated into a future build file). Returning to the example above in Table 1, assuming that the resulting build was of sufficient quality, then the new laser power parameter S205 may be stored as a modified process parameter 216 that is used in future builds of the same part.

Note that build quality component 208 may further be used to determine the quality of a build using an open-loop control mode. For example, after modifying certain process parameters, another build may be performed using open-loop control mode by control system 104 and the resulting build may be analyzed using build quality component 208 to confirm that the modified process parameters work well in an open-loop control mode. This may be useful when certifying builds and build processes.

In this example, parameter optimization component 202 further includes an open-loop parameter modification component 210, which may be configured to provide an interface for modifying initial process parameters based on closed-loop control feedback.

For example, open-loop parameter modification component 210 may present all potential process parameter modifications as determined by closed-loop control analyzer component 204 to a user in order to determine which modifications should be committed. In some embodiments, open-loop parameter modification component 210 may pre-process and/or filter potential process parameter modifications based on those that meet threshold tests determined by threshold detection component 206, and/or those that meet build quality thresholds as determined by build quality component 208, to name a few examples.

Further, open-loop parameter modification component 210 may be configured to control the granularity of the change to a process parameter, such as whether the change applies to a portion of a layer, an entire layer, or a set of layers, or even across an entire model. Various process parameters may be treated differently in terms of the scope of their change within a build file. For example, a material flow rate may be changed for an entire build file, while a laser power may be modified for particular layers, or even particular portions of layers. Many other examples exist. The changes may also be subject to limitations, such as maximum and minimum values, which may relate to additive manufacturing machine capabilities, material limitations, and the like.

Further yet, open-loop parameter modification component 210 may allow for manual changes to process parameters to be entered by a user based on review of data or even "live" during a build process based on observation of a build process.

Open-loop parameter modification component 210 may further include settings for affecting how a process parameter is modified based on feedback data and/or user input. For example, open-loop parameter modification component 210 may include modification or change rate parameters configured to adjust the speed of modification to avoid parameter oscillation (e.g., where one change in a first direction leads to another change in an opposite direction). Returning to the example above in Table 1, if a rate change parameter for laser power was set to 50% of the determined difference in the parameter, then the modified process parameter may be set to 230 instead of 205 since 50% of the difference of 50 is 25.

As another example, assuming that a process parameter is changed multiple times across a build layer (or a portion of a build layer), open-loop parameter modification component 210 may choose an ending parameter of the layer (or portion of the build layer), or a median or average of the process parameter over the layer (or portion of the build layer), in order to determine a modified process parameter. Such a determination may further be subject to a modification rate parameter, such as described above.

In some embodiment, open-loop parameter modification component 210 may ultimately be the arbiter of which potential process parameter changes are committed as modified process parameters (e.g., 216) and integrated into modified build files.

Figure 3:
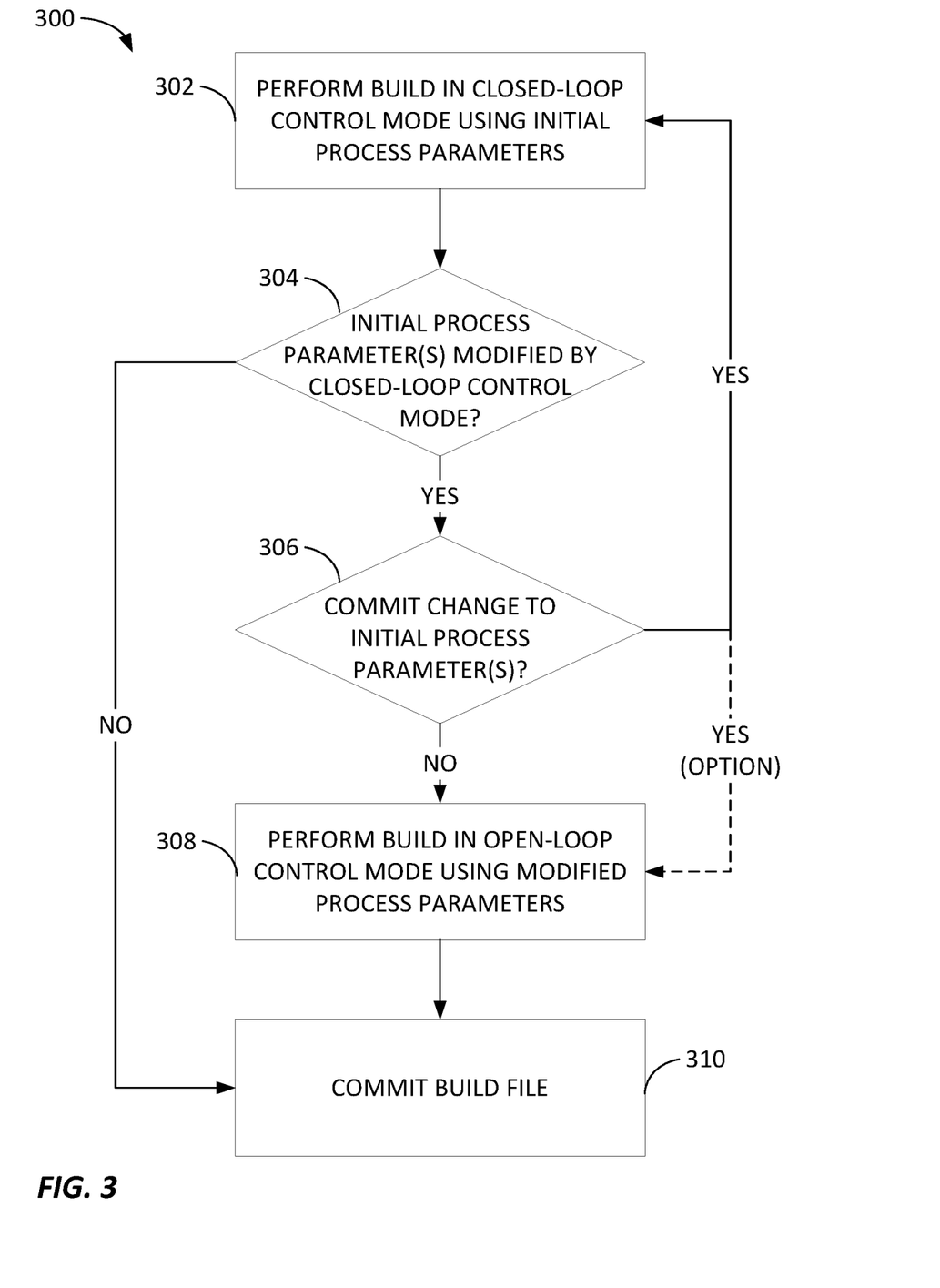
FIG. 3 depicts an example process flow for optimizing process parameters for additive manufacturing.

FIG. 3 depicts an example process flow 300 for optimizing process parameters for additive manufacturing. In one example, flow 300 may be implemented by parameter optimization component 202 of FIG. 2.

Flow 300 begins at step 302 with performing a build (e.g., using an additive manufacturing apparatus, such as additive manufacturing apparatus 100 of FIG. 1) using a closed-loop control mode and initial process parameters. For example, the initial process parameters may be in a build file, such as a G-code file configured to control the additive manufacturing machine to build a part.

Flow 300 then proceeds to step 304 where it is determined if any initial process parameters have been modified during the closed-loop control mode build. For example, closed-loop control analyzer component 204 may be used to analyze build log files 214 as described with respect to FIG. 2.

If at step 304, no initial process parameters are modified by the closed-loop control mode, then process 304 moves to step 310 where the build file may be committed (e.g., finalized for production of a part). In some cases, step 310 may involve confirming that the build file produces a part according to defined characteristics.

If at step 304, one or more initial process parameters are modified by the closed-loop control mode, the flow 300 proceeds to step 306 where it is determined whether to commit the changes to the initial process parameters to a modified build file. For example, the determination may be based on parameter deviation thresholds (e.g., determined by threshold detection component 206 of FIG. 2), build quality characteristics (e.g., determined by build quality component 208 of FIG. 2), and/or other operator feedback (e.g., determined by open-loop parameter modification component 210 of FIG. 2).

If changes to initial process parameters are committed at step 306, thereby creating modified process parameters (e.g., 216 of FIG. 2), flow 300 may return to step 302 to perform another build in closed-loop control mode. In this example, flow 300 may be configured to iterate until the process parameters converge and are no longer requiring committed changes (e.g., via step 306).

In an alternative example, after committing changes to initial process parameters at step 306, flow 300 may proceed to step 308. This option may be based on, for example, the changes to initial process parameters being below a threshold amount change (despite being significant enough to warrant a committed change). As another example, this option may be based on an operator override to stop the system from continuing to iterate. As yet another example, this option may be based on reaching a number of build iterations. Other examples are possible.

If changes to initial process parameters are not committed at step 306, such as if the changes are below a threshold for commitment, flow 300 proceeds to step 308. Here, using a threshold to avoid committing small changes may help the process 300 to converge on a final set of process parameters, and to avoid oscillation in parameters caused by small variations in processing that do not negatively affect overall build quality.

At step 308, another build process is performed in an open-loop control mode using process parameters, which may include one or more modified process parameters per step 306. The build may thereafter be confirmed to be of sufficient quality (or to meet other characteristics) such that a build file using process parameters (which may include one or more modified process parameters) may be committed at step 310. Thereafter, the committed build file maybe used for production of further parts, and may also be certified for part production using the open-loop control mode.

Example Method for Optimizing Process Parameters for Additive Manufacturing

Figure 4:
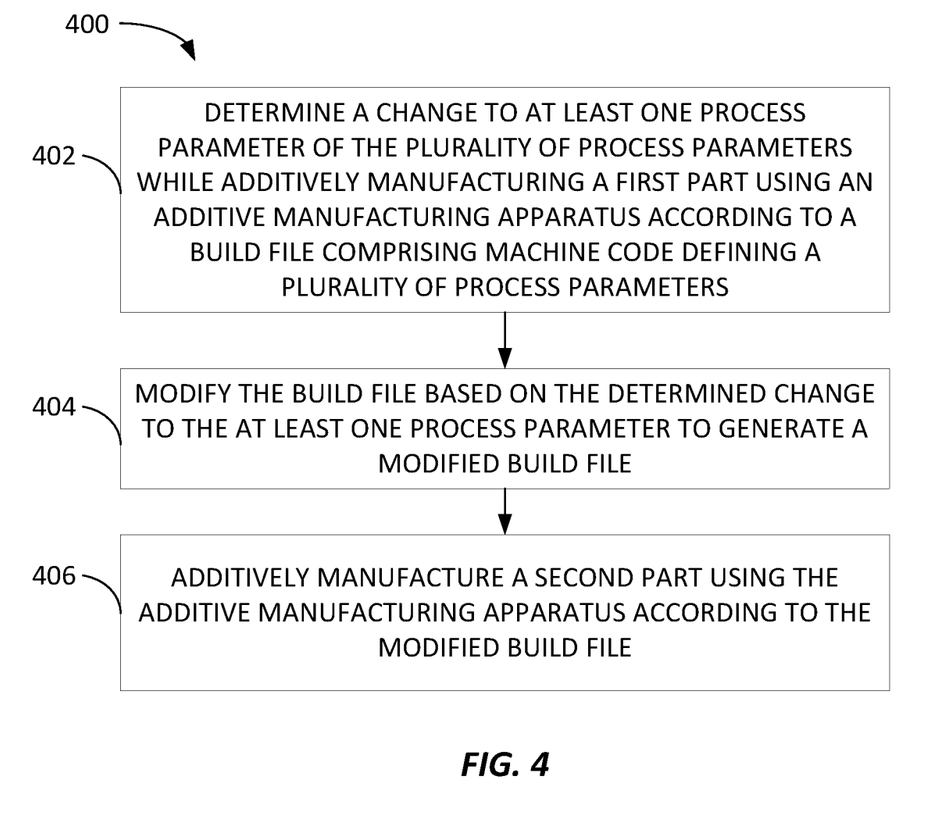
FIG. 4 depicts an example method for optimizing process parameters for additive manufacturing.

FIG. 4 depicts an example method 400 for optimizing process parameters for additive manufacturing. In one example, method 400 may be implemented by parameter optimization component 202 of FIG. 2.

Method 400 begins at step 402 with determining a change to at least one process parameter of a plurality of process parameters while additively manufacturing a first part using an additive manufacturing apparatus according to a build file comprising machine code defining the plurality of process parameters. For example, a change may be determined by closed-loop control analyzer 204 of FIG. 2. As described above, additively manufacturing the first part is performed in a closed-loop control mode.

In some embodiments, determining the change to the at least one process parameter of the plurality of process parameters includes receiving sensor data from a sensor while additively manufacturing the first part; and determining the change based on the sensor data. In such embodiments, the closed-loop control mode may be based at least in part on the sensor data. In various embodiments, the sensor comprises one or more of a melt-pool temperature sensor, a melt-pool size sensor, a layer height sensor, a powder flow (or material feed rate) sensor; a working distance sensor (e.g., configured to measure a distance between a deposition head and a current deposition surface), an image sensor; a substrate temperature sensor; or an acoustic sensor.

In some embodiments, determining the change to the at least one process parameter of the plurality of process parameters comprises receiving the change via a user interface of the additive manufacturing apparatus. For example, a user may input a change while observing the build process or based on review of data from a build process.

In some embodiments, determining the change to the at least one process parameter of the plurality of process parameters comprises determining a plurality of incremental changes to the at least one process parameter and determining the change to the at least one process parameter based on an average value or median value of the plurality of incremental changes.

In some embodiments, wherein determining the change to the at least one process parameter of the plurality of process parameters comprises determining a plurality of incremental changes to the at least one process parameter and determining the change to the at least one process parameter based on a value of the last incremental change of the plurality of incremental changes.

In some embodiments, the change is associated with a single layer of the build file. In other embodiments, the change may be associated with a portion of a layer, such as a particular deposition line or path segment (which may be referred to as an intra-layer change). In further embodiments, the change may be associated with a subset of layers of a build file (e.g., a multi-layer change), or an entire build file (e.g. a model-level change).

Method 400 then proceeds to step 404 with modifying the build file based on the determined change to the at least one process parameter to generate a modified build file. For example, as described above, modified process parameter may be stored (e.g., in 216 of FIG. 2) and integrated into modified build files.

In some embodiments, modifying the build file based on the determined change to the at least one process parameter comprises averaging a value of the changed at least one process parameter with an initial value of the at least one process parameter.

In some embodiments, modifying the build file based on the determined change to the at least one process parameter comprises modifying one or more machine codes in the build file based on the determined change.

Method 400 then proceeds to step 406 with additively manufacturing a second part using the additive manufacturing apparatus according to the modified build file. Note here that additively manufacturing the "second part" merely indicates a further part is performed in an open-loop control mode. As described above with respect to FIG. 3, it is possible that several parts are manufactured in a closed-loop control mode (e.g., step 306 in FIG. 3) while the set of process parameters converges to a final set.

In some embodiments, method 400 further includes recording the change to the at least one process parameter in a process log file. In some embodiments, method 400 further includes presenting the process log file in a user interface and indicating in the user interface the change to the at least one process parameter in a process log file, such as in user interface 102 of additive manufacturing system 100 of FIG. 1.

In some embodiment, the at least one process parameter comprises one or more of: a laser power, a scan rate, a material flow rate (e.g., a powder flow rate), or a working distance. Other examples, as described herein, are also possible.

In some embodiment, the additive manufacturing apparatus comprises a laser metal deposition apparatus, such as described with respect to the additive manufacturing system 100 of FIG. 1.

Example Clauses

Implementation examples are described in the following numbered clauses:

Clause 1: A method for optimizing process parameters for additive manufacturing, comprising: determining a change to at least one process parameter of a plurality of process parameters while additively manufacturing a first part using an additive manufacturing apparatus according to a build file comprising machine code defining the plurality of process parameters; modifying the build file based on the determined change to the at least one process parameter to generate a modified build file; and additively manufacturing a second part using the additive manufacturing apparatus according to the modified build file, wherein: additively manufacturing the first part is performed in a closed-loop control mode, and additively manufacturing the second part is performed in an open-loop control mode.

Clause 2: The method of Clause 1, wherein determining the change to the at least one process parameter of the plurality of process parameters comprises: receiving sensor data from a sensor while additively manufacturing the first part; and determining the change based on the sensor data, wherein the closed-loop control mode is based at least in part on the sensor data.

Clause 3: The method of Clause 2, wherein the sensor comprises one of: a melt-pool temperature sensor; a melt-pool size sensor; a layer height sensor; a working distance sensor; a powder flow sensor; an image sensor; a substrate temperature sensor; or an acoustic sensor.

Clause 4: The method of any one of Clauses 1-3, wherein determining the change to the at least one process parameter of the plurality of process parameters comprises receiving the change via a user interface of the additive manufacturing apparatus.

Clause 5: The method of any one of Clauses 1-4, wherein modifying the build file based on the determined change to the at least one process parameter comprises averaging a value of the changed at least one process parameter with an initial value of the at least one process parameter.

Clause 6: The method of any one of Clauses 1-5, wherein determining the change to the at least one process parameter of the plurality of process parameters comprises determining a plurality of incremental changes to the at least one process parameter and determining the change to the at least one process parameter based on an average value or median value of the plurality of incremental changes.

Clause 7: The method of any one of Clauses 1-6, wherein determining the change to the at least one process parameter of the plurality of process parameters comprises determining a plurality of incremental changes to the at least one process parameter and determining the change to the at least one process parameter based on a value of a last incremental change of the plurality of incremental changes.

Clause 8: The method of any one of Clauses 1-7, wherein the change is associated with a single layer of the build file.

Clause 9: The method of any one of Clauses 1-7, wherein the change is associated with only a portion of a single layer of the build file.

Clause 10: The method of any one of Clauses 1-9, further comprising: recording the change to the at least one process parameter in a process log file; presenting the process log file in a user interface; and indicating in the user interface the change to the at least one process parameter in the process log file.

Clause 11: The method of any one of Clauses 1-10, wherein the at least one process parameter comprises a laser power.

Clause 12: The method of any one of Clauses 1-10, wherein the at least one process parameter comprises a scan rate.

Clause 13: The method of any one of Clauses 1-10, wherein the at least one process parameter comprises a material flow rate.

Clause 14: The method of any one of Clauses 1-13, wherein modifying the build file based on the determined change to the at least one process parameter comprises modifying one or more machine codes in the build file based on the determined change.

Clause 15: The method of any one of Clauses 1-14, wherein the additive manufacturing apparatus comprises a laser metal deposition apparatus.

Clause 16: A processing system, comprising: a memory comprising computer-executable instructions; and one or more processors configured to execute the computer-executable instructions and cause the processing system to perform a method in accordance with any one of Clauses 1-15.

Clause 17: A processing system, comprising means for performing a method in accordance with any one of Clauses 1-15.

Clause 18: A non-transitory computer-readable medium comprising computer-executable instructions that, when executed by one or more processors of a processing system, cause the processing system to perform a method in accordance with any one of Clauses 1-15.

Clause 19: A computer program product embodied on a computer-readable storage medium comprising code for performing a method in accordance with any one of Clauses 1-15.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for optimizing process parameters for additive manufacturing, comprising:
    measuring one or more characteristics of a melt pool while additively manufacturing a first part using an additive manufacturing apparatus according to a build file comprising machine code defining a plurality of process parameters;
    determining a change to at least one process parameter of the plurality of process parameters, wherein the determined change is configured to alter the one or more characteristics of the melt pool;
    determining at least one modified process parameter based on the determined change;
    modifying the build file based on the determined change to the at least one process parameter to generate a modified build file; and
    additively manufacturing a second part using the additive manufacturing apparatus according to the modified build file,
    wherein:
        additively manufacturing the first part is performed in a closed-loop control mode, and
        additively manufacturing the second part is performed in an open-loop control mode.

2. The method of claim 1, wherein determining the change to the at least one process parameter of the plurality of process parameters comprises:
    receiving sensor data from a sensor while additively manufacturing the first part, wherein the sensor is configured to measure the one or more characteristics of the melt pool; and
    determining the change based on the sensor data, wherein the closed-loop control mode is based at least in part on the sensor data.

3. The method of claim 2, wherein the sensor comprises one of:
    a melt-pool temperature sensor;
    a melt-pool size sensor;
    a layer height sensor;
    a working distance sensor;
    a powder flow sensor;
    an image sensor;
    a substrate temperature sensor; or
    an acoustic sensor.

4. The method of claim 1, wherein determining the change to the at least one process parameter of the plurality of process parameters comprises receiving the change via a user interface of the additive manufacturing apparatus.

5. The method of claim 1, wherein modifying the build file based on the determined change to the at least one process parameter comprises averaging a value of the changed at least one process parameter with an initial value of the at least one process parameter.

6. The method of claim 1, wherein determining the change to the at least one process parameter of the plurality of process parameters comprises determining a plurality of incremental changes to the at least one process parameter and determining the change to the at least one process parameter based on an average value or median value of the plurality of incremental changes.

7. The method of claim 1, wherein determining the change to the at least one process parameter of the plurality of process parameters comprises determining a plurality of incremental changes to the at least one process parameter and determining the change to the at least one process parameter based on a value of a last incremental change of the plurality of incremental changes.

8. The method of claim 1, wherein the change is associated with a single layer of the build file.

9. The method of claim 1, wherein the change is associated with only a portion of a single layer of the build file.

10. The method of claim 1, further comprising:
    recording the change to the at least one process parameter in a process log file;
    presenting the process log file in a user interface; and
    indicating in the user interface the change to the at least one process parameter in the process log file.

11. The method of claim 1, wherein the at least one process parameter comprises a laser power.

12. The method of claim 1, wherein the at least one process parameter comprises a scan rate.

13. The method of claim 1, wherein the at least one process parameter comprises a material flow rate.

14. The method of claim 1, wherein modifying the build file based on the determined change to the at least one process parameter comprises modifying one or more machine codes in the build file based on the determined change.

15. The method of claim 1, wherein the additive manufacturing apparatus comprises a laser metal deposition apparatus.

16. A processing system, comprising:
    a memory comprising computer-executable instructions; and
    one or more processors configured to execute the computer-executable instructions and cause the processing system to:
        measure one or more characteristics of a melt pool while additively manufacturing a first part using an additive manufacturing apparatus according to a build file comprising machine code defining a plurality of process parameters;

determine a change to at least one process parameter of the plurality of process parameters, wherein the determined change is a configured to alter the one or more characteristics of the melt pool;

determine at least one modified process parameter based on the determined change;

modify the build file based on the determined change to the at least one process parameter to generate a modified build file; and additively manufacture a second part using the additive manufacturing apparatus according to the modified build file, wherein:
 additively manufacturing the first part is performed in a closed-loop control mode, and
 additively manufacturing the second part is performed in an open-loop control mode.

17. The processing system of claim 16, wherein in order to determine the change to the at least one process parameter of the plurality of process parameters, the one or more processors are further configured to cause the processing system to:

receive sensor data from a sensor while additively manufacturing the first part wherein the sensor is configured to measure the one or more characteristics of the melt pool; and determine the change based on the sensor data, wherein the closed-loop control mode is based at least in part on the sensor data.

18. The processing system of claim 17, wherein the sensor comprises one of:
 a melt-pool temperature sensor;
 a melt-pool size sensor;
 a layer height sensor;
 a working distance sensor;
 a powder flow sensor;
 an image sensor;
 a substrate temperature sensor; or
 an acoustic sensor.

19. The processing system of claim 16, wherein the at least one process parameter comprises at least one of: a laser power, a scan rate; or a material flow rate.

20. The processing system of claim 16, wherein the additive manufacturing apparatus comprises a laser metal deposition apparatus.

* * * * *